United States Patent
Hong et al.

(10) Patent No.: US 9,181,456 B2
(45) Date of Patent: Nov. 10, 2015

(54) ROOFING PRODUCT INCLUDING ROOFING-GRADE ASPHALT MIXTURE AND METHODS OF MAKING THE ROOFING PRODUCT AND THE ROOFING-GRADE ASPHALT MIXTURE

(71) Applicants: Keith C. Hong, Lititz, PA (US); Gregory F. Jacobs, Oreland, PA (US)

(72) Inventors: Keith C. Hong, Lititz, PA (US); Gregory F. Jacobs, Oreland, PA (US)

(73) Assignee: CertainTeed Corporation, Valley Forge, PA (US)

(*) Notice: Subject to any disclaimer, the term of this patent is extended or adjusted under 35 U.S.C. 154(b) by 155 days.

(21) Appl. No.: 13/724,729

(22) Filed: Dec. 21, 2012

(65) Prior Publication Data
US 2013/0160674 A1      Jun. 27, 2013

Related U.S. Application Data

(60) Provisional application No. 61/580,121, filed on Dec. 23, 2011.

(51) Int. Cl.
*C09D 195/00*       (2006.01)
*C08L 95/00*        (2006.01)
(Continued)

(52) U.S. Cl.
CPC ............. *C09D 195/00* (2013.01); *C08L 95/00* (2013.01); *D06N 5/003* (2013.01); *E04D 1/20* (2013.01); *E04D 5/10* (2013.01); *C08L 2555/34* (2013.01); *C08L 2555/40* (2013.01); *C08L 2555/52* (2013.01); *C08L 2555/64* (2013.01)

(58) Field of Classification Search
CPC .......... C09D 195/00; E04D 5/10; E04D 1/20; D06N 5/003; C08L 95/00; C08L 2555/34; C08L 2555/52; C08L 2555/40; C08L 2555/64
See application file for complete search history.

(56) References Cited

U.S. PATENT DOCUMENTS 3,043,786 A * 7/1962 White ..................... 521/43.5
3,258,419 A * 6/1966 Hanson ..................... 208/44
(Continued)

FOREIGN PATENT DOCUMENTS

EP      1524300 A1    10/2004
GB       610629       10/1948

OTHER PUBLICATIONS

Technical Search, 1 page, 2011.
(Continued)

*Primary Examiner* — Randy Boyer
*Assistant Examiner* — Juan Valencia
(74) *Attorney, Agent, or Firm* — Alexander H. Plache; Abel Law Group, LLP

(57) ABSTRACT

A method of forming an asphalt mixture can include mixing a bio-asphalt and a bitumen source material different from the bio-asphalt. The bio-asphalt can be formed by mixing a bio-source material with a liquid catalyst. Particles can be added to the asphalt mixture. In an embodiment, the bitumen source material can have a softening point of at least approximately 93° C. and a penetration distance no greater than approximately 25 dmm. In another embodiment, the roofing-grade asphalt mixture can have a softening point of at least approximately 104° C., a penetration distance no greater than approximately 12 dmm, a viscosity of at least approximately 3000 cps at a temperature of 204° C., or any combination thereof. The asphalt mixture can be applied to a base material to form a roofing product. The asphalt mixture can be applied as a pavement product.

14 Claims, 3 Drawing Sheets

(51) Int. Cl.
*E04D 1/20* (2006.01)
*D06N 5/00* (2006.01)
*E04D 5/10* (2006.01)

(56) References Cited

U.S. PATENT DOCUMENTS

| | | |
|---|---|---|
| 4,289,864 A | 9/1981 | Van Eanam |
| 7,241,500 B2 | 7/2007 | Shiao et al. |
| 7,951,417 B1 | 5/2011 | Wen et al. |
| 8,168,032 B2 | 5/2012 | Kalkanoglu et al. |
| 2005/0072110 A1 | 4/2005 | Shiao et al. |
| 2008/0220167 A1 | 9/2008 | Wisniewski et al. |
| 2010/0147190 A1* | 6/2010 | Naidoo et al. ............ 106/229 |

OTHER PUBLICATIONS

OM Group, Inc. "Coatings & Inks: Driers for Solvent-borne Coatings" 2 pages, 2007.
OM Group, Inc. "Polymerization Catalysts" 2 pages, 2007.
C. Wang and S. Erhan "Studies of Thermal Polymerization of Vegetable Oils with a Differential Scanning Calorimeter" 6 pages, 1999.

* cited by examiner

ROOFING PRODUCT INCLUDING ROOFING-GRADE ASPHALT MIXTURE AND METHODS OF MAKING THE ROOFING PRODUCT AND THE ROOFING-GRADE ASPHALT MIXTURE

FIELD OF THE DISCLOSURE

The present disclosure relates to asphalt mixtures, roofing products and methods of making the roofing products and asphalt mixtures.

RELATED ART

Asphalt mixtures can find applications in the paving or roofing industries. Roofing products can be in different forms, such as shingles or membranes. The roofing products can include a base material and a bituminous material. The base material can include wood, a wood derivative (e.g., paper), fiberglass, organic fibers (e.g., polyester), or the like. Conventionally, the bituminous material can include asphalt, a filler, and potentially a plasticizer. A variety of fillers has been used including limestone, talc, fly ash, coal fines, or other relatively inert materials. Limestone has been most commonly used as filler in roofing products due to its relatively low cost and its compatibility with a wide variety of materials used for roofing products. Regardless of the composition of a roofing product, the roofing product must still be able to withstand the rigors of shipping and handling, installation, and exposure to outdoor environments for many years.

BRIEF DESCRIPTION OF THE DRAWINGS

Embodiments are illustrated by way of example and are not limited in the accompanying figures.

Figure 1:
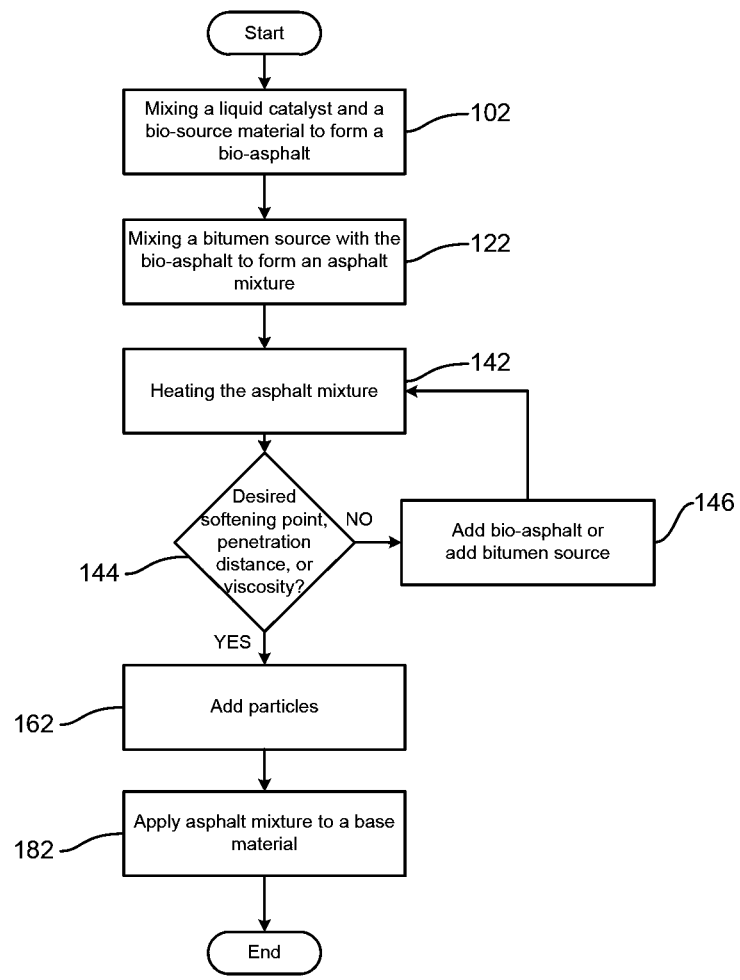
FIG. 1 includes a process flow diagram illustrating an exemplary method of forming an asphalt mixture.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

The term "perimeter volume" is intended to mean a volume generally defined by outer surfaces of an object. For example, a fiberglass mat can include glass fibers in the form of an open structure. The outer surfaces of the fiberglass mat are used to determine the perimeter volume. The volume occupied by only the glass fibers within the fiberglass mat may be substantially less than the perimeter volume.

The term "principal surfaces," with respect to a roofing article or product, is intended to mean a pair of opposite surfaces of such roofing article or product, wherein one of the surfaces lies or would lie farther from a structure to which the roofing article or product is installed or intended to be installed, and the other surface of such roofing article or article lies or would lie closer to a structure to which the roofing article or article is installed or intended to be installed. When installed, the principal surface farther from the structure may be directly exposed to an outdoor environment, and the other principal surface may contact the structure or a different roofing product that lies between the other principal surface and the structure.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the roofing product arts and corresponding manufacturing arts.

An asphalt mixture or roofing product can include a bio-asphalt. The bio-asphalt can include a bio-source material. The asphalt mixture or roofing product can further include a bitumen source material different from the bio-asphalt. The asphalt mixture or roofing product can further include particles. In embodiments as described herein, the bio-asphalt in the roofing-grade asphalt mixture may allow use of the bitumen source material that may otherwise not be used in making roofing-grade asphalt. In a particular embodiment, the bitumen source material has a softening point of at least approximately 95° C. and a penetration distance (100 g at 25° C., ASTM D5) no greater than approximately 25 dmm. The bitumen source material may be a petroleum-based asphalt, coal tar, or the like. The bio-asphalt can be a partially oxidized bio-source material, such as vegetable oil, cooking oil, animal fat, whether new or used (recycled), modified, or any combination thereof.

Modified oils and fats include transesterified oils and fats. Unsaturated fatty acid ester derived from natural sources such as vegetable oil/animal fat can be chemically modified to change or replace parts of its structure. In a typical chemical modification, glycerol part of fatty acid ester is replaced with any other alcohol (or combination of alcohols) to make fatty acid ester. Unsaturated fatty acid ester can also be modified by blowing in presence of any oxygen containing gas or reacting with any oxidation catalyst or exposing to UV light or heating at higher temperature or in any combination of these methods. Unsaturated fatty acid can also be further cross-linked by chemical reactions such as via epoxidation or via photocrosslinking.

In a particular embodiment, the bio-asphalt includes a partially oxidized recycled vegetable oil. The bio-asphalt may include particles, such as limestone, dolomite, talc, clay, coal fines, fly ash, gypsum, calcite, or any combination thereof, and may be added before or after the oxidation is performed. The oxidation of the bio-source material can be performed in the presence of a catalyst. In a particular embodiment, the catalyst for oxidation is provided in a liquid form. An exemplary catalyst includes a metal salt. The metal of the metal salt can include cobalt, manganese, zirconium, vanadium, iron, calcium, nickel, copper, zinc, osmium, rhodium, rhenium, hafnium, or any combination thereof. Other suitable catalysts include metal driers such as metal carboxylates wherein the metal is selected from the group of cobalt, manganese, calcium, zirconium, cerium, zinc, vanadium, iron, aluminum, strontium, barium, nickel, osmium, rhodium, rhenium, hafnium, lithium, or any combination thereof. Non-limiting examples of such driers include cobalt octoate, cobalt linolate, vanadium naphthenate, vanadium octoate, zirconium octoate, cobalt naphthenate, lithium neodecanoate, cobalt octoate in methyl soyate, manganese linoleate, and combinations thereof.

The asphalt mixture can be applied to a base material during formation of a roofing product, such as a roofing shingle, a roofing membrane, another suitable roofing product that includes an asphalt mixture, or the like. If needed or desired, roofing granules, a parting agent, an adhesive, a release sheet, or any combination thereof may be applied to a surface of the combination of base material and roofing-grade asphalt.

The asphalt mixture can also be applied as a pavement or road surface material during road construction or road maintenance. If needed or desired, fillers, plasticizer, and other construction material, such as sand, gravel, rubber particles, or any combination thereof may be added.

The combination of the bio-asphalt, the bitumen source material different from the bio-asphalt, and the particles can form a roofing-grade asphalt mixture, which is also referred to as a filled coating. The roofing-grade asphalt mixture or filled coating can have a softening point of at least approximately 104° C. (220° F.), a penetration distance no greater than approximately 12 dmm, a viscosity of at least approximately 3000 cps at a temperature of 177° C. (350° F.), or any combination thereof. The roofing-grade asphalt mixture can be used to form a roofing product, such as a roofing shingle, a roofing membrane, or another suitable roofing product that includes a roofing-grade asphalt.

In embodiments as described herein, the use of bio-asphalt may allow an off-specification bitumen source material to be used and still form a roofing-grade asphalt mixture of acceptable quality. Further, the asphalt mixture or roofing product can provide a more environmentally acceptable solution to conventional roofing-grade asphalt that includes a petroleum-based asphalt as a sole bitumen source material. The roofing-grade asphalt can use a renewable source that is less likely to be irreversibly depleted. Similarly, fluctuations in the supply of such bio-source materials may be less affected by political or other factors. Still further, the roofing-grade asphalt mixture can reduce the amount of spent bio-based materials that may otherwise need to be disposed of by less environmentally acceptable means.

FIG. 1 includes a non-limiting, exemplary process flow that can be used to form an asphalt mixture or a roofing product using a bio-asphalt and a bitumen source material. In the embodiment of FIG. 1, the method includes partially oxidizing a bio-source material at block 102 by mixing a liquid catalyst and a bio-source material to form a bio-asphalt. The bio-source material can be oxidized to achieve a desired softening point, penetration distance, viscosity, or other suitable characteristics. In an embodiment, the oxidation can be performed such that a combination of the bio-source material and the liquid catalyst has a softening point of at least approximately 88° C. (190° F.), at least approximately 90° C. (194° F.), or at least approximately 93° C. (200° F.). In another embodiment, the oxidation can be performed such that a combination of the bio-source material and the liquid catalyst has a softening point of not greater than approximately 110° C. (230° F.), not greater than approximately 105° C. (221° F.), or not greater than approximately 102° C. (215° F.).

The oxidation may be performed using air, nitrogen, oxygen, carbon dioxide, chlorine, another suitable oxidizing gas, or a combination of these gases at a time and temperature such that any needed or desired characteristic of the bio-source material or the bitumen source material (for example, softening point, penetration distance, viscosity, another suitable parameter, or any combination thereof) is achieved. In one embodiment, the oxidation can be performed in the absence of air. In a particular embodiment, the oxidation may be performed at a temperature in a range of approximately 100° C. (212° F.) to approximately 235° C. (455° F.). The oxidation of the bio-source material can be performed in the presence of a catalyst. In a particular embodiment, the catalyst for oxidation is provided in a liquid form. The oxidation can be performed until a needed or desired characteristic of the bio-asphalt, for example, softening point, penetration distance, viscosity, another suitable parameter, or any combination thereof is achieved. After reading this specification, skilled artisans will be able to determine the particular conditions used for the oxidation. For the purposes of this specification, a bio-asphalt material is a partially oxidized vegetable oil, a partially oxidized cooking oil, a partially oxidized animal oil, a partially oxidized animal fat, or any combination thereof.

Referring to FIG. 1, the method can include mixing the partially oxidized bio-source material (bio-asphalt) with a bitumen source material to form the asphalt mixture, at block 122. At least part of the bitumen source material can include a bitumen source material that, by itself, may have unacceptable characteristics for roofing-grade asphalt, which is referred to as "off-spec asphalt." The bio-asphalt may allow the off-spec asphalt to be used in making an asphalt mixture having road surface grade or roofing grade that meets performance specifications and other desirable characteristics.

The bitumen source material can be different from the bio-asphalt. Such a bitumen source material can include a petroleum-based bitumen, coal tar, or another suitable bitumen source material. Unlike the bio-asphalt, the bitumen source material may be a non-renewable bitumen source material, as it may take many years (for example, hundreds of years, thousands of years, or longer) to form the bitumen source material. For a bitumen source material that has a softening point that is too high and a penetration distance that is too low, such a bitumen source material may not be oxidized. In a particular embodiment, the bitumen source material can include one or more than one bitumen source material, wherein at least one of the other bitumen source materials that may have unsuitable characteristics for a roofing-grade asphalt.

The off-spec bitumen source material may have a softening point that is too high and a penetration distance that is too low. In an embodiment, the off-spec asphalt bitumen source material can have a softening point of at least approximately 102° C. (215° F.) and a penetration distance no greater than approximately 20 dmm. In a particular embodiment, the softening point can be at least 105° C. (221° F.) or at least approximately 108° C. (226° F.). In another particular embodiment, the penetration distance may be no greater than approximately 17 dmm, no greater than approximately 14 dmm, or no greater than approximately 11 dmm. In yet another particular embodiment, the off-spec bitumen source material has a softening point no greater than approximately 110° C. (230° F.) and a penetration distance of at least approximately 10 dmm.

In a further embodiment, another bitumen source material may be used in addition to or in place of the off-spec bitumen source material. The other bitumen source material may meet the specifications for roofing-grade asphalt. The bio-asphalt can be used to extend the other bitumen source material.

Referring to block 122 of FIG. 1, the bio-asphalt and the bitumen source material may be combined to obtain a desired softening point, penetration distance, viscosity, or another suitable characteristic is obtained as previously described. In a particular embodiment, the bio-asphalt and the bitumen source material can be combined and mixed using a mechanical mixer. The mixing may be performed as low shear mixing or as high shear mixing. The low shear mixing can be in the form of blending, and the high shear mixing can be in the form of milling or dispersing.

In an embodiment, mixing can be performed at a temperature of at least approximately 175° C. (346° F.), at least approximately 180° C. (355° F.), or at least approximately 185° C. (364° F.). In another embodiment, mixing can be performed at a temperature of no greater than approximately 235° C. (455° F.), no greater than approximately 230° C. (446° F.), or no greater than approximately 225° C. (437° F.). The combination of the bio-asphalt and bitumen source material, without any filler material as described below, is hereinafter referred to as a raw coating material.

The roofing-grade asphalt mixture has a total bitumen content corresponding to the content of the bio-asphalt and the bitumen source material. In an embodiment, the bio-asphalt is at least approximately 5 wt %, at least approximately 11 wt %, or at least approximately 15 wt % of the total bitumen content. In another embodiment, the bio-asphalt is no greater than approximately 50 wt %, no greater than approximately 40 wt %, or no greater than approximately 35 wt % of the total bitumen content.

If needed or desired, an additive chemical can be used with the raw coating material. The additive chemical can include a process oil, a plasticizer, a polymer modifier, a hardener, another suitable compound, or any combination thereof. The process oil can include a naphthenic oil, an aliphatic oil, or an aromatic oil, another suitable oil, or any combination thereof. Another exemplary compound can include a styrene-butadiene-styrene, a styrene-ethylene-butylene-styrene, a styrene-isoprene-styrene, an acrylonitrile-butadiene-styrene, an atactic polypropylene, an isotactic polypropylene, a high density polyethylene, an ethylene-polypropylene copolymer, another suitable plasticizer or polymeric compound, or any combination thereof. A thermoplastic olefin can be formed using a metallocene catalyst and include a block copolymer polypropylene, a polyethylene-propylene rubber, or another suitable material.

In an embodiment, the additive chemical may be added to the raw coating material. In another embodiment, the additive chemical can be added to the bio-asphalt or the bitumen source material before the raw coating material is formed. Typically, the additive chemical is in the form of a solid or a liquid at room temperature. When an additive chemical is used, the raw coating material may include substantially none of the additive chemical, at least approximately 5 weight % of the additive chemical, or at least approximately 10 weight % of the additive chemical. In another embodiment, the raw coating material may include no greater than approximately 40 weight %, no greater than approximately 30 weight %, or no greater than approximately 25 weight % of the additive chemical.

In one embodiment, the oxidation can be performed such that the combination of the bio-asphalt and the bitumen source material has a softening point no greater than approximately 120° C. (248° F.), no greater than approximately 115° C. (239° F.), or no greater than 112° C. (234° F.). In yet another embodiment, the combination of the bio-asphalt and the bitumen source material can have a penetration distance of less than approximately 40 dmm, less than approximately 30 dmm, or less than approximately 25 dmm. In another embodiment, the combination of the bio-asphalt and the bitumen source material can have a penetration distance of at least approximately 10 dmm, at least approximately 15 dmm, or at least approximately 18 dmm. In a further embodiment, the oxidation can be performed such that the viscosity of the combination of the bio-asphalt and bitumen source material, when measured at 177° C. (350° F.) is at least approximately 500 cps, at least approximately 600 cps, or at least approximately 700 cps. In another embodiment, the oxidation can be performed such that the viscosity of the bio-asphalt, when measured at 177° C. (350° F.) is at no greater than approximately 2000 cps, no greater than approximately 1700 cps, or no greater than approximately 1500 cps. In addition, the oxidation can be performed such that the viscosity of the combination of the bio-asphalt and bitumen source material, when measured at 204° C. (400° F.) is at least approximately 100 cps, at least approximately 150 cps, or at least approximately 200 cps. In another embodiment, the oxidation can be performed such that the viscosity of the bio-asphalt, when measured at 204° C. (400° F.) is at no greater than approximately 1000 cps, no greater than approximately 700 cps, or no greater than approximately 500 cps.

A determination is made whether desired properties, such as softening point, penetration distance, viscosity, or any other property (not illustrated) are obtained, at decision tree 144. The decision can be made dependent from the determination of one or more of properties. If the desired property or properties are obtained, the method continues with the finishing operations. If the desired property or properties are not obtained, such the process can be rerouted to previous steps. In an embodiment, an additional amount of bio-asphalt or bitumen source material can be added to the asphalt mixture and the asphalt mixture can undergo further heating. In another embodiment (not illustrated), a bitumen source, either the same or different from the bitumen source already added to the asphalt mixture can be added. In yet another embodiment (not illustrated), after determining an undesired property, the mixture can undergo further heating without adding any other material.

Referring to block 162 of FIG. 1, particles can be combined with asphalt mixture, and if present, the additive chemical, to form a roofing-grade asphalt mixture also referred to as a filled coating. Such particles can also be referred to as filler and can include limestone, dolomite, talc, clay, coal fines, fly ash, gypsum, calcite, another suitable filler material, or any combination thereof. In yet another embodiment, the particles may be added to the bio-source material, and if present, the additive chemical. In another embodiment, the particles can be added to the bio-asphalt or the bitumen source material (after oxidation of the bitumen source material), before the raw coating material is formed. In a further embodiment, the particles can be added to the asphalt mixture or also referred to as the raw coating material, before the additive chemical, if present, is combined with the raw coating material. The combination of the raw coating material, the particles, and if present, the additive chemical is referred to as the filled coating material. In a particular embodiment, the roofing grade asphalt mixture is the filled coating material, and can include an additional material if needed or desired for a particular application.

In a shingle embodiment, the roofing-grade asphalt mixture can include at least approximately 45 weight % of particles, at least approximately 50 weight % of particles, or at least approximately 55 weight % of particles. In another shingle embodiment, the roofing-grade asphalt mixture may include no greater than approximately 80 weight % of particles, no greater than approximately 75 weight % of particles, or no greater than approximately 70 weight % of particles. In a membrane embodiment, the roofing-grade asphalt mixture may include at least approximately 5 weight % of particles, or at least approximately 10 weight % of particles. In another membrane embodiment, the roofing-grade asphalt mixture may include no greater than approximately 70 weight % of particles, no greater than approximately 50 weight % of particles, or no greater than approximately 40 weight % of particles.

The method can further include applying the mixture to a base structure, at block 182 of FIG. 1. For roofing-grade asphalt mixture, the base material can include a fiberglass mat, a cellulose-based material, a ceramic base material, a polymer fiber material, or the like. In a particular embodiment, the cellulose-based material can include wood or paper fibers. In another particular embodiment, the polymer fiber material can include a polyester. In another embodiment, the ceramic base material can be vitreous or non-vitreous. In another embodiment, the ceramic base material can include ceramic fibers (e.g., glass fibers). In another embodiment, the ceramic base material can include material as described in U.S. Pat. No. 8,168,032, which is incorporated herein by reference in its entirety. In a particular embodiment, the base material includes an open structure. The open structure can allow the roofing-grade asphalt mixture to flow within the open structure. The open structure can be in the form of pores, channels, interstitial openings within a matrix, another suitable void, or any combination thereof. Applying the roofing-grade asphalt mixture can be performed using any one or more methods. In an embodiment, the base material can be submerged into the roofing-grade asphalt mixture. In another embodiment (not illustrated), the open structure of the base material can be filled by spraying or coating the roofing-grade asphalt mixture onto the base material.

When the base material includes an open structure, the open structure may be partly or substantially completely filled with asphalt mixture. The outermost portions of the base material may or may not be exposed after the asphalt mixture is applied. In an embodiment, the volume of the asphalt mixture is greater than a perimeter volume of the base material, and in another embodiment, the volume of the asphalt mixture is no greater than the perimeter volume of the base material. In a particular embodiment, a portion of a principal surface of the base material may be exposed; however, most of the structure or volume of the base material may be embedded within or saturated with the asphalt mixture.

The method further includes finish processing of the asphalt product. Finishing can include one or more operations. For a roofing-grade asphalt mixture or a filled coating, in an embodiment, roofing granules can be applied to a surface of the coated base material. The roofing granules can be used for ultraviolet radiation protection, coloration, impact resistance, fire resistance, another suitable purpose, or any combination thereof. The roofing granules can include inert base particles that are durable, inert inorganic mineral particles, such as andesite, boehmite, coal slag, diabase, metabasalt, nephaline syenite, quartzite, rhyodacite, rhyolite, river gravel, mullite-containing granules, another suitable inert material, or any combination thereof.

In another embodiment (not illustrated in FIG. 1), the roofing granules can also include one or more surface coatings over the inert base particles. A surface coating can cover at least approximately 75% of the surface of the inert base particle, and may cover at least approximately 90% of the surface of the inert base particle. In a particular embodiment, the surface coating continuously covers the surface of the inert base particle, and such surface coating layer has a substantially uniform thickness. If more than one surface coating is used, a subsequent surface coating may cover an underlying surface coating to the extent described with respect to the inert base particles.

If more than one surface coating is used, a surface coating closer to the inert base particles can include a binder that can be inorganic or organic. An inorganic binder can include a silicate binder, a titanate binder, a zirconate binder, an aluminate binder, a phosphate binder, a silica binder, another suitable inorganic binder, or any combination thereof. An organic binder can include a polymeric compound. In a particular embodiment, an organic binder can include an acrylic latex, polyurethane, polyester, silicone, polyamide, or any combination thereof. One or more additional organic binders of the same or different composition can be used.

A surface coating can include a solar reflective material that helps to reflect at least some of the solar energy. For example, UV radiation can further polymerize or harden the asphalt within roofing product being fabricated. A solar reflective material can include titanium dioxide, zinc oxide, or the like. Alternatively, the solar reflective material can include a polymeric material. In an embodiment, a polymer can include a benzene-modified polymer (e.g., copolymer including a styrene and an acrylate), a fluoropolymer, or any combination thereof. Other solar reflective materials are described in U.S. Pat. No. 7,241,500 and U.S. Publication Nos. 2005/0072110 and 2008/0220167, all of which are incorporated by reference for their teachings of materials that are used to reflect radiation (e.g., UV, infrared, etc.) from the sun.

A surface coating can include an algaecide or another biocide to help reduce or delay the formation of algae or another organic growth. The algaecide or other biocide can include an organic or inorganic material. The algaecide or other biocide can include a triazine, a carbamate, an amide, an alcohol, a glycol, a thiazolin, a sulfate, a chloride, copper, a copper compound, zinc, a zinc compound, another suitable biocide, or any combination thereof. In a particular embodiment, the algaecide or other biocide can be included within a polymeric binder. The polymeric binder can include polyethylene, another polyolefin, an acid-containing polyolefin, ethylene vinyl acetate, an ethylene-alkyl acrylate copolymer, a polyvinylbutyral, polyamide, a fluoropolymer, an acrylic, a methacrylate, an acrylate, polyurethane, another suitable binder material, or any combination thereof. Alternatively, the binder may be a solvent-based surface coating, a radiation curable surface coating, or a two-part reactive surface coating. These alternative surface coatings may likewise include any of previously described polymeric materials. The same or different algaecide or other biocide can be used within different surface coatings. An algaecide or another biocide is not required to be present in every surface coating of the roofing granules. In another particular embodiment, the algaecide or other biocide can be an inorganic material that is included within an inorganic binder, for example, within an alkali metal silicate binder. An exemplary inorganic algaecide or other biocide can include a metal (by itself), a metal oxide, a metal salt, or any combination thereof. The metallic element used within the metal, metal oxide, or salt may include copper, zinc, silver, or the like. The metal salt can include a metal sulfate, a metal phosphate, or the like.

A surface coating can include a colorant or another material to provide a desired optical effect. The colorant or other material can include a metal oxide compound, such as titanium dioxide (white), zinc ferrite (yellow), red iron oxides, chrome oxide (green), and ultramarine (blue), silver oxide (black), zinc oxide (dark green), or the like. In another embodiment, the colorant or other material may not be a metal-oxide compound. For example, the colorant may include carbon black, zinc or aluminum flake, or a metal nitride.

An additional surface coating may be used for a different purpose not described herein. For example, the surface coating can include a different oxide, nitride, oxynitride, carbide, oxycarbide, or any combination thereof. After reading this specification, skilled artisans will be able to determine if an additional function or purpose is to be served by the roofing granules and whether an existing surface coating or material within a surface coating serves such a function or purpose or if an additional surface coating or an additional material within an existing surface coating would be needed or desired.

In addition to or in place of applying roofing granules, another finishing operation can be performed. For example, after the roofing granules are applied, another surface coating (not illustrated), similar to any single or combination of binders and surface coatings previously described with respect to the roofing granules, may be coated onto the roofing product after roofing granules have been applied. Such binder or surface coating may have a solar reflective property, an algaecide or other biocide, a pigment or another appearance modifier, or any combination thereof as previously described.

In another finishing operation, a parting agent can be applied to a surface of the roofing product. The parting agent helps to keep the roofing product from sticking to itself or sticking to other manufacturing equipment, such as the equipment used in the web handling or cutting operation. The parting agent can include particles of sand, talc, limestone, dolomite, slag, another relatively inert material, or any combination thereof. If the roofing product includes roofing granules, the parting agent is applied to the surface of the roofing product opposite the roofing granules. After applying the roofing granules, parting agent, or both are applied, the roofing product can be processed during a stamping or cutting operation to achieve a desired shape for a finished roofing product. In particular, the finished roofing product is in the form of a roofing shingle.

In another embodiment, a membrane-type roofing product can be manufactured. The membrane-type roofing product has significant differences that are mostly seen with the finishing operations of the manufacturing process because the membrane-type roofing product is typically a self-adhesive product, although this is not a requirement. The finishing operations for a membrane-type roofing product can vary depending on the particular application.

In a particular embodiment, a principal surface of the membrane-type roofing product can be directly exposed to an outdoor environment. For this particular application, roofing granules, a surface coating, or both may be used. When the membrane-type roofing product is used as part of an underlayment or as a lower layer of a built-up roofing system, roofing granules may or may not be used. The membrane-type roofing product may be applied directly to a roof deck as a base sheet or an underlayment. In this particular application, an adhesive can be used to provide a good seal to help reduce the likelihood of water damage from ice dams. Accordingly, the finishing operation includes applying adhesive and a release sheet to the roofing product. The adhesive can include a tackifier, such as polyvinylbutyral, a pressure sensitive adhesive, another suitable compound, or any combination thereof. A pressure sensitive adhesive can include a silicone, a rubber, an acrylate, a bituminous adhesive, or the like. In a particular embodiment, a styrene-isoprene-styrene rubber composition can be used. A release sheet can be dispensed from a supply roll to the adhesive side to form the roofing product.

In an alternative embodiment (not illustrated), an adhesive modifier can be added to the roofing-grade asphalt that is first applied to the base structure, or to an asphalt coating applied to the surface of the roofing product that will be closest to a roofing structure. Thus, a separate adhesive application operation may be eliminated. In this particular embodiment, the release sheet would be applied to the surface having the adhesive-modified roofing-grade asphalt.

In still another embodiment, no finishing operation may be performed, only one or some, but not all, of the previously-described finishing operations may be performed, or another finishing operation may be performed in addition to or in place of another finishing operation as previously described. Alternatively, a take-up roll may be used instead of or before performing the stamping or cutting operation. After reading this specification, skilled artisans will be able to configure a manufacturing line for the particular roofing product being formed.

After reading this specification, skilled artisans will appreciate that many other roofing products can be made using the concepts as described herein. The particular materials, coatings, processes, and other parameters can be tailored for the roofing products that are needed or desired.

Figure 2:
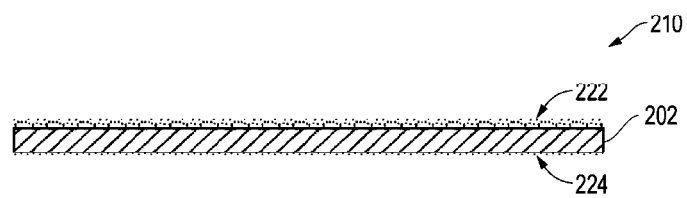
FIG. 2 includes an illustration of a cross-sectional view of a roofing product in accordance with an embodiment.

FIG. 2 includes an illustration of a cross-sectional view of the finished roofing product 210. The finished roofing product 210 includes a coated base material 202 that includes any of the roofing-grade asphalt mixtures as previously described. Roofing granules 222 are applied to a principal surface of the coated base material 202, and a parting agent 224 is applied to an opposite principal surface of the coated based material 202.

Figure 3:
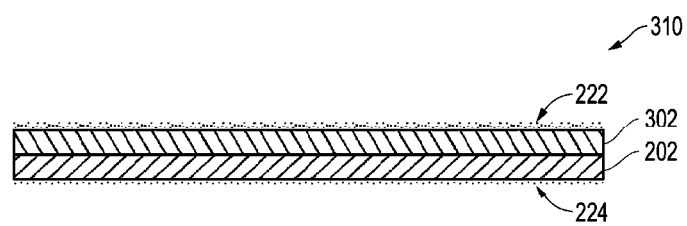
FIG. 3 includes an illustration of a cross-sectional view of a roofing product in accordance with another embodiment.

FIG. 3 includes an illustration of a cross-sectional view of the finished roofing product 310. The finished roofing product 310 includes the coated base material 202, roofing granules 222 and parting agent 224 as previously described with respect to the roofing product 210. Unlike the roofing product 210, the roofing product 310 includes a roofing-grade asphalt coating 302 that is disposed between the coated base material 202 and the roofing granules 222. The roofing-grade asphalt coating 302 can include any of the roofing-grade asphalt mixtures as previously described. Thus, the roofing-grade asphalt coating 302 may have substantially the same composition or a different composition as compared to the roofing-grade asphalt mixture within the coated base material 202.

In another embodiment, the roofing-grade asphalt coating 302 can include a conventional roofing-grade asphalt composition that is substantially free of a bio-source material. In a further embodiment, the asphalt compositions of the coated base material 202 and roofing-grade asphalt coating 302 can be reversed. In particular, the coated base material 202 can include a conventional roofing-grade asphalt composition, and the roofing-grade asphalt coating 302 can include the roofing-grade asphalt mixture that includes the bio-asphalt.

Figure 4:
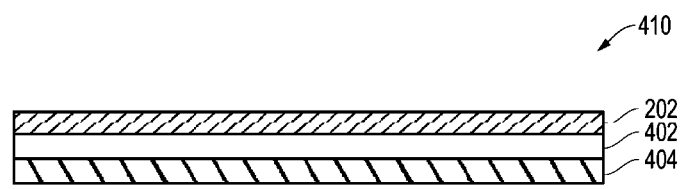
FIG. 4 includes an illustration of a cross-sectional view of a roofing product in accordance with a further embodiment.

FIG. 4 includes an illustration of a cross-sectional view of the finished roofing product 410. The finished roofing product 410 includes the coated base material 202 as previously described with respect to the roofing product 210. Unlike the roofing product 210 that has the parting agent 224, the roofing product 410 includes a layer of adhesive 402 and a release sheet 404. The roofing product 410 can be a roofing membrane. When the roofing product 410 is an underlayment, roofing granules may not be present. When the roofing product 410 has a principal surface that is exposed to outdoor conditions, roofing granules (not illustrated in FIG. 4) may be present along the principal surface opposite that of the layer of adhesive 402.

After reading this specification, skilled artisans will appreciate that FIGS. 2 to 4 illustrate only a few potential roofing products that can be formed with a roofing-grade asphalt mixture that includes a bio-asphalt. Other roofing products can be made without departing from the concepts as described herein.

When properly prepared, the roofing-grade asphalt mixture can include bio-asphalt and still meet the stringent requirements in order to produce roofing products that meet or exceed specifications. The bio-asphalt can be used to replace at least part of other bitumen source materials, and in particular petroleum-based asphalt. Further, the bio-asphalt can be used to help recover an off-spec bitumen source material that may otherwise have been discarded. A wider variety of bitumen source materials can be used. In addition, the cost of fabricating roofing products may not fluctuate as much, and supply concerns may be less, as bio-asphalt may be produced domestically.

The embodiments as described herein can be used to produce a roofing product that can include a bio-source material that may be new or used. In an embodiment, the bio-source can be used oils, such as used vegetable oil, used cooking oil, used animal oil, used animal fat, or other materials from other industries. For example, significant amounts of vegetable and animal oils are used or generated from restaurants. Such organic materials from biological sources may be limited value to others, as such materials may not be suitable for use in producing fuel-grade products, paving grade asphalt, or the like. Roofing-grade or pavement-grade asphalt has different criteria, so materials that can be recycled or used for other industries may be used to form roofing-grade asphalt. Thus, organic materials from biological sources, whether new or used, that may otherwise be of no significant commercial use in other industries may be used, recycled, processed, or the like for use in making bio-asphalt for a roofing-grade asphalt mixture.

Further, fabrication of roofing or pavement products is not significantly altered. The handling and application of the roofing-grade asphalt mixture and further fabrication of the roofing product can be substantially identical to that used for roofing products that include conventional roofing-grade asphalt. Likewise, the handling and application of the pavement-grade asphalt mixture and further fabrication of the pavement product can be substantially identical to that used for pavement products that include conventional pavement-grade asphalt. Thus, significantly different equipment and processes may not need to be used or integrated into an existing fabrication line.

Many different aspects and embodiments are possible. Some of those aspects and embodiments are described herein. After reading this specification, skilled artisans will appreciate that those aspects and embodiments are only illustrative and do not limit the scope of the present invention.

Figure 5:
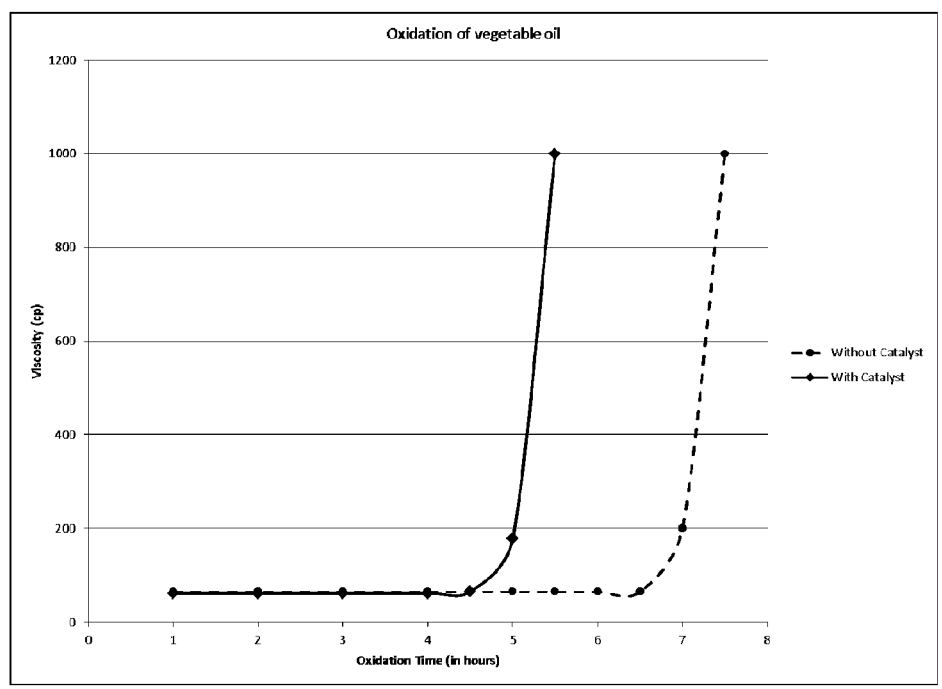
FIG. 5 includes a graph depicting the increase of viscosity of vegetable oil in the presence or absence of a catalyst during oxidation.

EXAMPLES 600 g of Wesson vegetable oil (main ingredient: soybean oil) in a 1 L container having blade propeller was oxidized at 149° C. (300° F.) by blowing air at the rate of 1 cfm and stirred at about 550 rpm. Experiments were conducted in the presence of catalysts. Catalysts were metal driers of the 2-Ethylcaproic acid salt family ("Octoates"). For example, experiments included 0.5 wt % cobalt octoate, 0.5 wt % calcium octoate, or 0.55 wt % of zirconium octoate (All catalysts obtained from Patcham USA LLC, Secaucus, N.J.). In a control experiment, the vegetable oil was oxidized without any catalyst. Viscosity was measured every hour using a Brookfield rotational viscometer DV-E at 149° C. (300° F.), spindle S21, 50 rpm. The viscosity results are depicted in FIG. 5. Table 1 below lists the measured viscosities.

In the absence of a catalyst, it took about 7 hour 30 minutes to reach viscosity of more than 1000 cps. In the presence of a catalyst, it took 5 hour 30 minutes to reach viscosity of more than 1000 cps. Accordingly, in presence of catalyst, vegetable oil oxidation was 27% faster than the control in given experimental conditions.

TABLE 1

| | Viscosity/cps | |
|---|---|---|
| Time/hr | without catalyst | catalyst |
| 1 | 65 | 62 |
| 2 | 65 | 62 |
| 3 | 65 | 62 |
| 4 | 65 | 62 |
| 4.5 | 65 | 66 |
| 5 | 65 | 178 |
| 5.5 | 65 | 1000 |
| 6 | 65 | |
| 6.5 | 65 | |
| 7 | 200 | |
| 7.5 | 1000 | |

In a first aspect, a method of forming an asphalt mixture can include mixing a bio-asphalt with a bitumen source different from the bio-asphalt to form the asphalt mixture. In one embodiment, the method can further include mixing a liquid catalyst with a bio-source material to form the bio-asphalt.

In one embodiment, the method can further include agitating. Agitating can include stirring, propelling, shearing, impelling, bubbling the mixture with a gas, or any combination thereof. In one embodiment, when bubbling the mixture with a gas, the gas can include oxygen, air, nitrogen, carbon dioxide, chlorine, or any combination thereof. In another embodiment, the gas is free of air. In another embodiment, when shearing the mixture, a gear pump or any mixer can be used.

In one further embodiment, the asphalt mixture formed by the method can include a roofing grade asphalt mixture. In one embodiment, the method can further include heating the asphalt mixture to at least about 100° C., such as at least about 120° C., at least about 140° C., or at least about 180° C. In another embodiment, the method can further include heating the asphalt mixture to not greater than about 260° C., such as not greater than about 240° C., not greater than about 220° C., not greater than about 200° C., or not greater than about 180° C.

In one embodiment, the liquid catalyst according to the method can include a metal salt. The metal can include cobalt, manganese, zirconium, vanadium, iron, calcium, nickel, copper, zinc, osmium, rhodium, rhenium, hafnium, or any combination thereof. In one other embodiment, the method includes a liquid catalyst that includes a metal salt, wherein the salt is a salt of an acid, the acid including naphthenic acid, octanoic acid, 2-ethylhexanoic acid, ethylenediaminetetraacetic acid (EDTA), ethylene glycol tetraacetic acid (EGTA), or any combination thereof. In another embodiment, the liquid catalyst can include a solvent. The solvent can include ethanol, propanol, glycerol, toluene, xylene, mineral spirits, or any combination thereof.

In one further embodiment, the bio-source material can include an oil. The oil can include cooking oil, vegetable oil, animal fat, animal oil, or any combination thereof. In one particular embodiment, the oil can include recycled cooking oil, recycled vegetable oil, recycled animal fat, recycled animal oil, modified vegetable oil, modified animal fat, or any combination thereof.

In another embodiment, the method can further include adding an oxidizer to the bio-asphalt. The oxidizer can include oxygen, chlorine, hypochlorous acid (HOCl), a hypochlorite, a peroxide, a permanganate, or any combination thereof.

In one particular embodiment, the bio-asphalt formed according to the method is substantially free of particulates. In another embodiment, the bio-asphalt formed according to the method has a single phase.

In one embodiment, the bitumen source comprises a petroleum-based asphalt. In another embodiment, the bio-source material comprises a partially oxidized oil.

In another embodiment, the asphalt mixture also referred to as a raw coating (unfilled coating) can have a softening point of at least approximately 88° C., a penetration distance no greater than approximately 30 dmm, a viscosity of not greater than approximately 2000 cps at a temperature of 177° C., or any combination thereof. In one further embodiment, the asphalt mixture can have a softening point of not greater than approximately 102° C., a penetration distance no greater than approximately 30 dmm, a viscosity of at least approximately 500 cps at a temperature of 177° C., or any combination thereof. In yet one further embodiment, the softening point of the asphalt mixture can be at least approximately 88° C., at least approximately 90° C., or at least approximately 93° C. In another embodiment, the softening point of the asphalt mixture can be not greater than approximately 110° C., not greater than approximately 105° C., or not greater than approximately 102° C.

In another embodiment, the bitumen source material can have a softening point of at least approximately 95° C. and a penetration distance no greater than approximately 25 dmm. In one further embodiment, the softening point of the bitumen source material can be at least approximately 105° C. or at least approximately 108° C. In yet one further embodiment, the penetration distance of the bitumen source material can be no greater than approximately 30 dmm, no greater than approximately 28 dmm, or no greater than 25 dmm. In one embodiment, the softening point of the bitumen source material is no greater than approximately 110° C., and the penetration distance of the bitumen source material is at least approximately 10 dmm.

In one embodiment, the asphalt mixture has a total bitumen content, wherein the bio-source material can be at least approximately 5 wt %, at least approximately 11 wt %, or at least approximately 15 wt % of the total bitumen content. In one further embodiment, the asphalt mixture has a total bitumen content, wherein the bio-source material can be no greater than approximately 50 wt %, no greater than approximately 40 wt %, or no greater than approximately 35 wt %.

In one embodiment, the mixing of the bio-asphalt with the bitumen source can be performed at a temperature of at least approximately 175° C., at least approximately 180° C., or at least approximately 185° C. In yet another embodiment, the mixing of the bio-asphalt with the bitumen source can be performed at a temperature no greater than approximately 235° C., no greater than approximately 230° C., or no greater than approximately 225° C.

In one embodiment, the asphalt mixture or raw coating can have a viscosity at 177° C. of at least approximately 500 cps, at least approximately 600 cps, at least approximately 700 cps, or at least approximately 800 cps. In another embodiment, the asphalt mixture or raw coating can have a viscosity at 177° C. no greater than approximately 2000 cps, no greater than approximately 1800 cps, no greater than approximately 1600 cps, or no greater than approximately 1500 cps.

In another embodiment, the method can further include adding particles to the bio-asphalt or the asphalt mixture. The particles can include limestone, dolomite, talc, clay, coal fines, gypsum, calcite, fly ash, or any combination thereof In a second aspect, a method of forming a roofing product can include mixing a liquid catalyst with a bio-source material to form a bio-asphalt. The method can further include mixing the bio-asphalt with a bitumen source different from the bio-asphalt and particles to form a roofing grade asphalt mixture. The method can further include applying the roofing-grade asphalt mixture to a base material.

In one embodiment, the bitumen source includes a petroleum-based asphalt. In another embodiment, the roofing-grade asphalt mixture, which includes a filler, has a softening point of at least approximately 104° C., a penetration distance no greater than approximately 12 dmm, a viscosity of at least approximately 3000 cps at a temperature of 177° C., or any combination thereof. In another embodiment, the bitumen source material can have a softening point of at least approximately 95° C. and a penetration distance no greater than approximately 25 dmm. In one embodiment, the softening point of the bitumen source material is at least approximately 100° C. or at least approximately 108° C. The penetration distance of the bitumen source material can be no greater than approximately 25 dmm, no greater than approximately 22 dmm, or no greater than 20 dmm. In another embodiment, the softening point of the bitumen source material can be no greater than approximately 110° C., and the penetration distance of the bitumen source material is at least approximately 10 dmm.

In one embodiment, the bio source material can include a recycled oil material. The recycled oil material can include a partially oxidized oil. The oil can include cooking oil, vegetable oil, an animal oil, recycled cooking oil, recycled vegetable oil, recycled animal fat, modified animal fat, modified vegetable oil, or any combination thereof.

In another embodiment, the softening point of the roofing-grade asphalt mixture can be at least approximately 100° C., at least approximately 103° C., or at least approximately 106° C. The softening point of the roofing grade asphalt mixture can be no greater than approximately 130° C., no greater than approximately 125° C., or no greater than approximately 120° C.

In another embodiment, the roofing-grade asphalt mixture or filled coating has a total bitumen content, wherein the bio-source material can be at least approximately 5 wt %, at least approximately 11 wt %, or at least approximately 15 wt % of the total bitumen content. In another embodiment, the roofing-grade asphalt mixture has a total bitumen content, wherein the bio-source material can be no greater than approximately 50 wt %, no greater than approximately 40 wt %, or no greater than approximately 35 wt %.

In one embodiment, the mixing of the bio-asphalt with the bitumen source can be performed at a temperature of at least approximately 175° C., at least approximately 180° C., or at least approximately 185° C. In another embodiment, the mixing of the bio-asphalt with the bitumen source is performed at a temperature of no greater than approximately 235° C., no greater than approximately 230° C., or no greater than approximately 225° C.

In one embodiment, the roofing-grade asphalt mixture or filled coating can have a viscosity, measured at 204° C., of at least approximately 3000 cps, at least approximately 3500 cps, at least approximately 3700 cps, or at least approximately 3900 cps. In one embodiment, the roofing-grade asphalt mixture can have a viscosity, measured at 177° C., of no greater than approximately 5000 cps, no greater than approximately 4500 cps, no greater than approximately 4400 cps, or no greater than approximately 4300 cps.

In one embodiment, the base material can include a fiberglass mat, a cellulose-based material, a ceramic base material, or a polymer fiber material. The cellulose-based material can include wood or paper fibers. The ceramic base material can include ceramic fibers. In a particular embodiment, the ceramic base material can be glass fibers. The polymer can include a polyester.

In one embodiment, applying the roofing-grade asphalt mixture to the base material can be performed such that the roofing-grade asphalt mixture substantially fills an open structure of the base material. In an embodiment, applying the roofing-grade asphalt mixture to the base material can be performed such that at least 50% of the roofing-grade asphalt material is outside of an open structure of the base material.

In one embodiment, the roofing product can include a roofing shingle. The particle content of the roofing shingle can be less than 80 weight % of the roofing-grade asphalt mixture. The particle can be added to the roofing product an amount of approximately 64 weight % to approximately 70 weight % of the roofing-grade asphalt mixture.

In another embodiment, the roofing product can include a membrane-type roofing product, and the particles are present at a content of less than about 60 weight % of the roofing-grade asphalt mixture. The content can be less than about 50 wt %, less than about 40 wt %, less than about 30 wt %, less than about 20 wt %, or less than about 10 wt %.

In one embodiment, the method can further include adding a plasticizer. The plasticizer can be added to the bio-asphalt. In another embodiment, the plasticizer can be added to the roofing grade asphalt mixture. In another embodiment, the plasticizer can be added to the bio-asphalt.

In one embodiment, the method further includes applying roofing granules to an exposed surface of the roofing product after applying the roofing-grade asphalt mixture to the base material.

In one embodiment, the method further includes applying a release sheet to an exposed surface of the roofing product after applying the roofing-grade asphalt mixture to the base material. The method can be performed such that the roofing product is in a form of a roofing shingle. In yet another embodiment, the method can be performed such that the roofing product is in a form of a roofing membrane.

In a third aspect, a roofing product includes a base material and a roofing-grade asphalt mixture. The roofing-grade asphalt mixture can include a bio-asphalt. The bio-asphalt can include a bio-source material and a catalyst residue. The bio-asphalt can further include a bitumen source material. The bitumen source material can be different from the bio-asphalt.

In one embodiment, the roofing product can include a bitumen source material that has a softening point of at least approximately 90° C. and a penetration distance no greater than approximately 25 dmm. The softening point of the bitumen source can be at least approximately 93° C. or at least approximately 95° C. In another embodiment, the penetration distance of the bitumen source material is no greater than approximately 30 dmm, no greater than approximately 25 dmm, or no greater than 20 dmm. The softening point of the bitumen source material can be no greater than approximately 110° C., and the penetration distance of the bitumen source material is at least approximately 10 dmm. In one particular embodiment, the bitumen source comprises a petroleum-based asphalt.

In one embodiment, the roofing-grade asphalt mixture or filled coating can have a softening point of at least approximately 104° C., a penetration distance no greater than approximately 12 dmm, a viscosity of at least approximately 3000 cps at a temperature of 177° C., or any combination thereof.

In another embodiment, the bio-source material can include a partially oxidized oil. The oil can include cooking oil, vegetable oil, an animal oil, recycled cooking oil, recycled vegetable oil, recycled animal fat, modified vegetable oil, modified animal fat, or any combination thereof.

In one embodiment, the softening point of the roofing-grade asphalt mixture or filled coating can be at least approximately 106° C., at least approximately 110° C., or at least approximately 115° C. The softening point of the roofing grade asphalt mixture can be no greater than approximately 130° C., no greater than approximately 125° C., or no greater than approximately 120° C. In one embodiment, the roofing-grade asphalt mixture has a total bitumen content, wherein the bio-source material is at least approximately 5 wt %, at least approximately 11 wt %, at least approximately 15 wt %, or at least approximately 20 wt % of the total bitumen content. In one embodiment, the roofing-grade asphalt mixture has a total bitumen content, wherein the bio-source material can have a content of no greater than approximately 50 wt %, no greater than approximately 40 wt %, or no greater than approximately 35 wt %.

In one embodiment, the roofing product can include particles. The particles can include limestone, dolomite, talc, clay, coal fines, gypsum, calcite, fly ash, or any combination thereof. In one embodiment, the roofing product has a base material that includes a fiberglass mat, a cellulose-based material, a ceramic base material, or a polymer. The cellulose-based material can include wood or paper fiber. The ceramic base material can be ceramic fibers. In another embodiment, the polymer includes a polyester. In one embodiment, the roofing-grade asphalt mixture substantially fills an open structure of the base material. In one embodiment, at least 50% of the roofing-grade asphalt material is outside of an open structure of the base material.

In one embodiment, the roofing product can include a roofing shingle. The roofing shingle can include a particle content that is less than 80 weight % of the roofing-grade asphalt mixture. In one particular embodiment, the particle content can include approximately 64 weight % to approximately 70 weight % of the roofing-grade asphalt mixture. In another embodiment, the roofing product includes a membrane-type roofing product, which has a particle content is less than 60 weight % of the roofing-grade asphalt mixture.

In one embodiment, the roofing-grade asphalt mixture further includes a plasticizer. Yet, in another embodiment, the roofing product further includes roofing granules along a surface of the roofing product. In another embodiment, the roofing product can further include a release sheet along a surface of the roofing product. In one embodiment, the roofing product can be in the form of a roofing shingle or in the form of a roofing membrane.

In one embodiment, the bio-source material can include unsaturated fatty acids, triglycerides, or a combination thereof. In another embodiment, the roofing grade asphalt can include a reaction product of the bio-source material and a catalyst.

In another embodiment, the catalyst residue can include a metal salt. The metal of the metal salt can include cobalt, manganese, zirconium, vanadium, iron, calcium, nickel, copper, zinc, osmium, rhodium, rhenium, hafnium, or any combination thereof. In one particular embodiment, the catalyst residue includes a metal salt wherein the metal consists essentially of a metal selected from cobalt, manganese, zirconium, vanadium, nickel, copper, zinc, osmium, rhodium, rhenium, hafnium, or any combination thereof.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A method of forming an asphalt mixture comprising:
mixing a liquid catalyst with a bio-source material to form a bio-asphalt,
wherein the liquid catalyst includes a solvent, wherein the solvent includes ethanol, propanol, glycerol, toluene, xylene, mineral spirits, or any combination thereof,
wherein the bio-source material includes an oil, wherein the oil includes cooking oil, vegetable oil, animal fat, recycled cooking oil, recycled vegetable oil, recycled animal fat, modified animal fat, modified vegetable oil, or any combination thereof; and
mixing the bio-asphalt with a bitumen source different from the bio-asphalt to form the asphalt mixture.

2. The method according to claim 1, further comprising agitating, wherein the agitating includes stirring, propelling, shearing, impelling, bubbling the mixture with a gas, or any combination thereof.

3. The method according to claim 1, further comprising heating the asphalt mixture to at least about 100.degree.

4. The method according to claim 2, wherein the liquid catalyst includes a metal salt wherein the metal includes cobalt, manganese, zirconium, vanadium, iron, calcium, nickel, copper, zinc, osmium, rhodium, rhenium, hafnium, or any combination thereof.

5. The method of claim 1, wherein the asphalt mixture has a softening point of at least approximately 88.degree. C., a penetration distance no greater than approximately 30 dmm, a viscosity of not greater than approximately 2000 cps at a temperature of 177.degree. C., or any combination thereof.

6. The method of claim 1, wherein the asphalt mixture has a softening point of not greater than approximately 102.degree. C., a penetration distance no greater than approximately 30 dmm, a viscosity of at least approximately 500 cps at a temperature of 177.degree. C., or any combination thereof.

7. The method of claim 2, wherein the asphalt mixture has a total bitumen content, wherein the bio-source material is at least approximately 5 wt % of the total bitumen content.

8. A method of forming a roofing product comprising:
mixing a liquid catalyst with a bio-source material to form a bio-asphalt,
wherein the liquid catalyst includes a solvent, wherein the solvent includes ethanol, propanol, glycerol, toluene, xylene, mineral spirits, or any combination thereof,
wherein the bio-source material includes an oil, wherein the oil includes a partially oxidized oil, the oil including cooking oil, vegetable oil, animal oil, recycled cooking oil, recycled vegetable oil, recycled animal fat, modified animal fat, modified vegetable oil, or any combination thereof; mixing the bio-asphalt with a bitumen source different from the bio-asphalt and particles to form a roofing grade asphalt mixture; and applying the roofing-grade asphalt mixture to a base material.

9. The method of claim 8, wherein the roofing-grade asphalt mixture has a softening point of at least approximately 104.degree. C., a penetration distance no greater than approximately 12 dmm, a viscosity of at least approximately 3000 cps at a temperature of 177.degree. C., or any combination thereof.

10. The method of claim 8, wherein a softening point of the roofing-grade asphalt mixture is at least approximately 100.degree. C.

11. The method of claim 8, wherein the roofing-grade asphalt mixture has a total bitumen content, wherein the bio-source material is at least approximately 5 wt % of the total bitumen content.

12. The method of claim 8, wherein the base material comprises a fiberglass mat, a cellulose-based material, a ceramic base material, a ceramic fiber material, or a polymer fiber material.

13. The method of claim 8, wherein the roofing product comprises a roofing shingle, and a particle content is less than 80 weight % of the roofing-grade asphalt mixture.

14. The method of claim 8, wherein the roofing product comprises a membrane-type roofing product, and particles are present at a content of less than about 60 weight % of the roofing-grade asphalt mixture.

* * * * *